US005249023A

United States Patent [19]

Miyashiro et al.

[11] Patent Number: 5,249,023

[45] Date of Patent: Sep. 28, 1993

[54] IMAGE FORMING APPARATUS HAVING ELECTROSTATIC ATTRACTION MEMBER

[75] Inventors: Toshiaki Miyashiro, Machida; Tatsuya Kobayashi, Tokyo, both of Japan

[73] Assignee: Canon Kabushiki Kaisha, Tokyo, Japan

[21] Appl. No.: 832,727

[22] Filed: Feb. 7, 1992

[30] Foreign Application Priority Data

Feb. 8, 1991 [JP] Japan .............................. 3-039200
Apr. 12, 1991 [JP] Japan .............................. 3-108950

[51] Int. Cl.[5] .............................. G03B 9/02

[52] U.S. Cl. .............................. 355/273; 355/275; 355/276; 355/309; 271/193

[58] Field of Search .............. 355/271, 273, 274, 275, 355/276, 309; 271/193

[56] References Cited

U.S. PATENT DOCUMENTS

| | | | |
|---|---|---|---|
| 4,415,256 | 11/1983 | Inoue et al. | 355/274 |
| 4,931,839 | 6/1990 | Tompkins et al. | 355/277 |
| 5,121,170 | 6/1992 | Bannai et al. | 355/326 |
| 5,128,717 | 7/1992 | Uchikawa et al. | 355/208 |
| 5,172,173 | 12/1992 | Goto et al. | 355/275 |
| 5,198,863 | 3/1993 | Goto et al. | 355/274 |

*Primary Examiner*—Michael L. Gellner
*Assistant Examiner*—P. Stanzione
*Attorney, Agent, or Firm*—Fitzpatrick, Cella, Harper & Scinto

[57] ABSTRACT

An image forming apparatus includes a recording material carrying member for carrying a recording material; an image forming device for forming an image on a recording material carried on the recording material carrying member; an attraction member for electrostatically attracting the recording material on the recording material carrying member; and voltage applying source for applying an oscillating voltage to the attraction member.

33 Claims, 12 Drawing Sheets

IMAGE FORMING APPARATUS HAVING ELECTROSTATIC ATTRACTION MEMBER

FIELD OF THE INVENTION AND RELATED ART

The present invention relates to an image forming apparatus for forming an image on a recording material carried on a recording material carrying means, more particularly to a full-color image forming apparatus for forming a full-color image on a recording material.

A color image forming apparatus of an electrostatic recording type using an electrophotographic process is known.

Referring first to FIG. 5, there is shown an example of a color image forming apparatus in which an electrostatic latent image is formed on an image bearing member 8 in accordance with image light 14 from a light source such as laser beam source or the like in accordance with image signal. A developing device 7A is used to develop the latent image on the image bearing member 8 with corresponding color developer to provide images in various colors. It comprises a plurality of developing units 7 containing respective color developers. An image transfer apparatus 17A includes transfer means and transfer drum 18 or the like to superposedly transfer various color images onto the image bearing member by image transfer means 4 onto the recording material in the form of the transfer material carried on the recording material carrying means in the form of the transfer drum 18 by electrostatic attraction with attraction member, so as to provide the color images. A cleaner 7 functions to remove the residual toner from the image bearing member after each of the image transfer operations. An image fixing device 13 functions to fix the image on the transfer material 17 which has been separated from the transfer drum 18 after the transfer of the various color images.

As shown in FIG. 6, the transfer drum 18 includes a hollow cylindrical frame 15B, in which the part of the circumference corresponding to the transfer region is cut away that is, the transfer drum 18 comprises opposing ring portions and a connecting portion for connecting them. The cut-away portion is covered with a stretched dielectric material sheet 15A which is typically made of polyethylene terephthalate (PET), poly vinylidene fluoride (PVdF) or fluorinated ethylene propylene copolymer (FEP).

The transfer apparatus 18A basically comprises the following elements around the transfer drum 18. An attraction roller 2 constituting an attraction member is disposed outside the transfer drum 18 away from the image bearing member 8. Across the circumference of t he transfer drum from the attraction roller 2, an attraction charger 3 constituting the attraction member is disposed inside the transfer drum 18. The attraction roller 2 functions to electrostatically attract the transfer material 17 on the dielectric material sheet 15A, and the attraction charger 3 functions at the time of attraction to charge the dielectric sheet 15A to attract the transfer material 17. At a position opposite from the image bearing member 8 across the circumference of the transfer drum 18, there is disposed a transfer charger 4 constituting the transfer means for transferring the image from the image bearing member 8 to the transfer material 17. Adjacent the top of the transfer drum, there is a pair of separation chargers 5 for promoting separation of the transfer material 17 from the dielectric sheet 15A, inside and outside of the transfer drum. Outside the transfer drum 18 and downstream of the separation charger 5 with respect to the rotational direction of the transfer drum 18, there is a separation discharger 6 for preventing separation discharge which may otherwise occur on the transfer material 17 after the separation. Adjacent thereto, separation pawls 10 are disposed for assisting separation of the transfer material 17 and for guiding the transfer material 17 to the transfer material conveyance passage 16 to the fixing device 12. At an outside position of the transfer drum 18 between the separation pawls 10 and the attraction roller 2, a transfer drum cleaner 11 for removing the toner deposited on the surface of the dielectric sheet 15A. Downstream thereof, there is a sheet discharger 1 for electrically initializing or resetting the dielectric sheet 15A.

The image forming operation process will be described in the color image forming apparatus provided with the above-described elements. First, an electrostatic latent image for a first color is formed on an image bearing member 8 by the image exposure 14 corresponding to the first color image signals. The latent image is developed with a developing unit 7Y containing a yellow developer so as to provide an yellow image. In parallel with such operation, a transfer material 17 is introduced to between the grounded attraction roller 2 and the dielectric sheet 15A on the transfer drum 18 surface. Simultaneously, the electric charge is applied to the backside of the dielectric sheet 15A by the attraction charger 3, and the transfer material 17 is supported on the dielectric material sheet 15A by the electrostatic attraction force. The transfer material 17 supported on the dielectric sheet 15A is fed with rotation of the transfer drum 18 to an image transfer position where the transfer drum 18 is faced to the image bearing member 8. In the image transfer position, the transfer charger 4 functions to transfer the yellow image from the image bearing member 18 to the transfer drum 17 thus conveyed thereto.

The residual toner on the image bearing member after the completion of the yellow image transfer, is removed from the image bearing member 8 by the cleaner 9. Then, a second color electrostatic latent image is formed on the image bearing member by the image exposure 14 in accordance with the second color image signal. The electrostatic latent image is developed by the developing device 7M containing the corresponding color developer, that is, magenta color image. The second color magenta image is superposedly transferred onto the transfer material 17 already having the first color, that is, yellow image transferred thereto, by the transfer charger 4 in the image transfer position, in the similar manner as described above.

Similarly, formation of a third color latent image on the image bearing member, development of the latent image by the developing device 3Y containing a cyan developer, for example, transfer of the cyan image onto the transfer material 17 by the transfer charger 4, formation of a fourth color electrostatic latent image, development by a developing device 3B containing a black developer, for example, transfer of a black image onto a transfer material 17 by the transfer charger 4, are carried out, so that a color image of superposed yellow image, magenta image, cyan image and black image is provided on the transfer material 17.

The transfer material 17 thus having the color image is carried to the position of the separation chargers 5 inside and outside of the transfer drum 18, with rotation of the transfer drum 18. The electrostatic attraction force between the transfer material 17 and the dielectric sheet 15A is removed by the transfer charger 5, and is separated from the transfer drum 18 by the separation pawls 10 while being discharged by the separation discharger 6. The separated transfer material 17 is conveyed along the transfer material conveying passage 16 to the fixing device 12, where the plural images on the transfer material 17 are mixed and fixed into a permanent color image. Then, the transfer material 17 is discharged to the outside of the image forming apparatus. After the separation of the transfer material 17, the transfer drum 18 is cleaned by removal of the toner from the dielectric sheet 15A by the transfer drum cleaner 17, and is electrically discharged by the sheet discharger 1, and therefore, is initialized.

In the foregoing example, the color image forming apparatus uses a typical transfer drum, that is, the transfer drum with cut-away portion. The plural images are transferred from the image bearing member onto the transfer material 17, thus providing a color image thereon.

In the conventional color image forming apparatus, various elements such as transfer charger 4 are disposed around the transfer drum 18, as described hereinbefore, with the result of complicated and costly apparatus. In addition, a great number of corona chargers such as the transfer charger 4 or the like, and therefore a relatively large amount of ozone is produced in the operation of the apparatus.

Another form of the transfer drum usable with superposing image transfer for the color image formation is not provided with the cut-away portion. A conductive drum 20 without the cut-away portion i coated with a dielectric sheet 15A (solid type). The transfer drum 21 is supplied with a bias voltage, by which the superposing image transfer is possible as in the transfer drum 18 having the cut-away portion. In the form of the transfer drum, the dielectric sheet 15A is supported at the entire surface by the drum 20, and therefore, the deformation and the damage of the dielectric sheet 15A which is the problem with the transfer drum 18 with the cut-away portion, can be eliminated. In addition, the inside structure of the transfer drum can be simplified. Still, however, a great number of elements such as transfer charger 4 or the like have to be disposed around the transfer drum 21. Therefore, the cost reduction is not so significant, and in addition, the problem of the ozone production arising from using a number of corona chargers, remains.

The description will be made as to the case of the transfer drum 21 shown in FIG. 7 in place of the transfer drum 18 of FIG. 5. The transfer material 17 is supplied along the transfer material conveying passagė and is introduced to between the transfer drum 21 and the attraction roller 2 which i contactable to the transfer drum 21. Simultaneously, the drum 20 is supplied with a DC voltage from a bias source for the attraction and first color transfer, so that the attraction roller 2 is supplied with a bias voltage from the bias source. By doing so, the transfer material 17 is supported on the transfer drum 21 by the electrostatic attraction force by the electric charge from the attraction roller 2. The transfer material 17 supported by the electrostatic force receives a visualized image, so that a color image is formed thereon. In this example, the entirety of the dielectric and flexible sheet 15A is supplied with uniform transfer bias voltage, and therefore, the problem of the transfer memory resulting from the overcharge flowing to the transfer drum and the problem of image non-uniformity resulting from the different current to the transfer material depending on whether the attracting operation is active or not, appear.

SUMMARY OF THE INVENTION

Accordingly, it is a principal object of the present invention to provide a small size and inexpensive image forming apparatus.

It is another object of the present invention to provide an image forming apparatus capable of reducing the amount of ozone production in the operation of the apparatus.

It is a further object of the present invention to provide an image forming apparatus in which the transfer memory is avoided.

It is a yet further object of the present invention to provide an image forming apparatus capable of providing images of uniform image density.

These and other objects, features and advantages of the present invention will become more apparent upon a consideration of the following description of the preferred embodiments of the present invention taken in conjunction with the accompanying drawings.

DETAILED DESCRIPTION OF THE PREFERRED EMBODIMENTS

Referring to the accompanying drawings, the description will be made as to the embodiments of the present invention.

Figure 1:
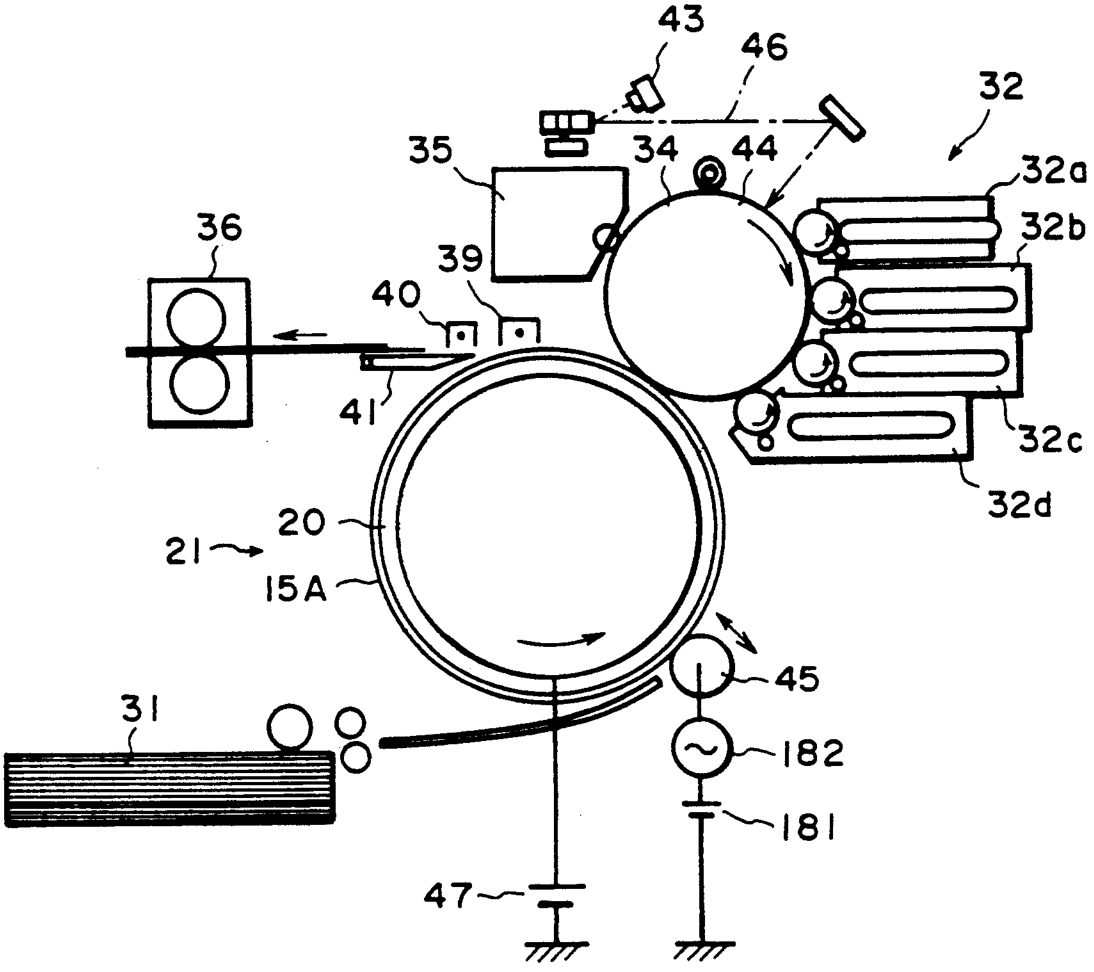
FIG. 1 is a side view of an image forming apparatus according to an embodiment of the present invention.

Referring to FIG. 1, there is shown a color electrophotographic printer as an exemplary image forming apparatus according to an embodiment of the present invention. In the image forming apparatus, the image bearing member in the form of a photosensitive drum 34 is uniformly charged by a primary charger 44 in the form of a roller or a corona charger. Subsequently, an electrostatic latent image for a first color is formed on the image bearing member by the image exposure light 46 in accordance with image signal for the first color image from a light emitting element 43 such as a laser or LED or the like. The electrostatic latent image visualized by a developing device 32*a* containing the Yellow (Y) developer, for example.

Figure 6:
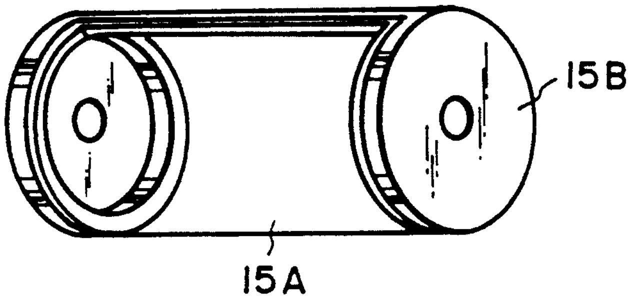
FIGS. 6, 7 and 8 are perspective views of transfer drums.
Figure 7:
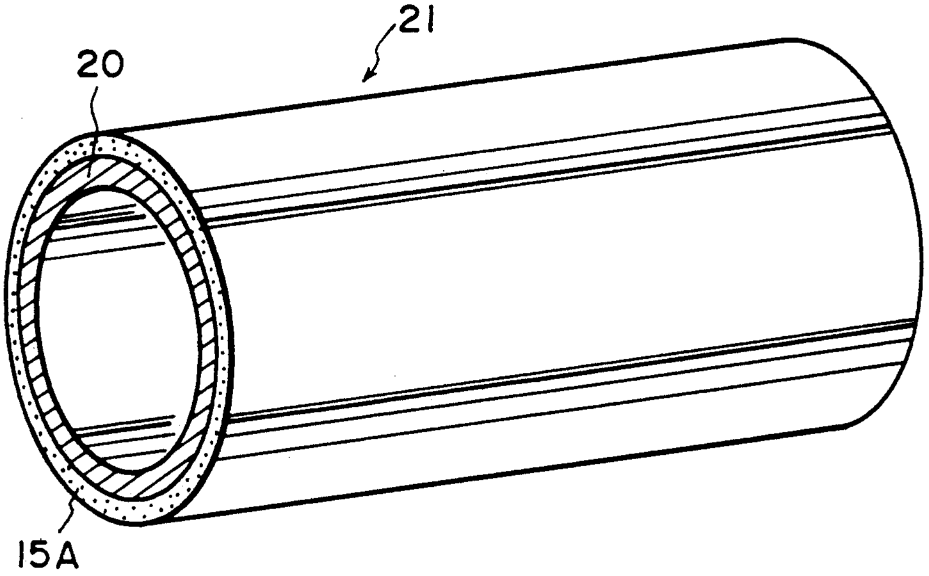

As shown in FIGS. 1 and 7, the recording material carrying means, in this embodiment, is in the form of a transfer drum 21 which comprises a cylindrical drum base 20 of conductive material without the cut-away portion and a flexible dielectric sheet 15A on the outer peripheral surface of the drum base 20, as has been described hereinbefore. The transfer drum 21 is supplied with a bias voltage. In the transfer drum 21 of this type, the number of chargers is smaller than in the transfer drum having the cut-away portion shown in FIG. 6, and in addition, the internal structure thereof can be simplified. Accordingly, the cost can be reduced, and the deformation or the damage of the sheet which is a problem of the transfer material carrying means having the cut-away portion can be reduced, and therefore, the durability increases, since the dielectric sheet 15A is backed up at the inside thereof by the entirety of the transfer drum. Thus, the durability of the transfer drum is enhanced.

Figure 8:
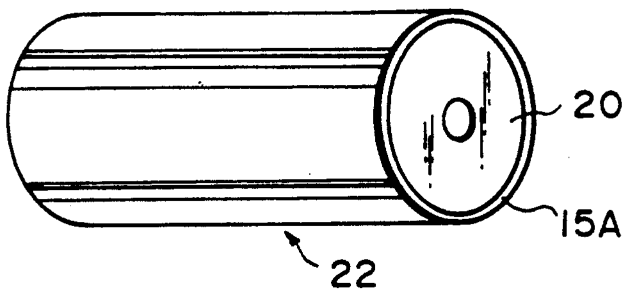

However, as shown in FIG. 8, a transfer drum 22 may be used in place of the transfer drum 21. In FIG. 8, the inside of the drum is filled with the drum base 20 of the electrically conductive material. The recording material in the form of the transfer sheet 31 is introduced to between the attraction roller and the dielectric sheet 15A constituting the surface of the transfer drum. The attraction roller 45 functions as an attraction member supplied with a voltage from the voltage sources 181 and 182. The transfer material 31 is supported on the surface of the sheet 15A of the transfer drum by the electrostatic attraction force resulting from the electric charge applied to the transfer material surface 31 from the attraction roller 45. Subsequently, the transfer material 31 is conveyed with the rotation of the transfer drum 21 to an image transfer position where the transfer drum 21 is contacted to the photosensitive drum 34, and the visualized image is transferred from the photosensitive drum 34 to the transfer material 31 by the operation of the transfer voltage source 47.

Thereafter, the photosensitive drum 34 is cleaned by the cleaner 35 so that the residual developer is removed therefrom. Then, it is again uniformly charged by the primary charger 44, and the second color latent image is formed in accordance with the image signal on the photosensitive drum 34. The electrostatic latent image is developed by a developing device 32*b* containing the magenta (M) developer corresponding to the second color image signals. Thus, the visualized image is provided. The second color visualized image is transferred onto the transfer material 31 already having the first color visualized image on the transfer drum 21, in the transfer position. The above-described steps are repeated for the third color image with the cyan (C) developer and for the fourth image with the black (BK) developer. Thus, the third and fourth visualized images are formed on the photosensitive drum 34, and they are superposedly transferred onto the transfer material 31 on the transfer drum in the similar manner as in the second color visualized image.

The transfer material 31 thus having the visualized color images is conveyed to the separation charger 39 disposed to the outside of the transfer drum 21 with the rotation of the transfer drum 29, and the electrostatic attraction force between the transfer material 31 and the flexible sheet 15A is removed by the separation charger 39. The transfer material is separated by the separation pawls 41 while being discharged by the separation discharger 40. The separated transfer material 31 is conveyed along the transfer material passage to a heat-fixing device 36 where it is mixed and fixed.

After the separation of the transfer material 31, the transfer drum 21 is cleaned by the cleaner (not shown) so that the developer deposited on the surface of the dielectric sheet 15A is removed.

The attraction roller 45 is supplied with a DC biased AC voltage to produce an oscillating electric field between the roller 45 and the dielectric sheet 15A by application of an oscillating voltage provided by a DC bias voltage source 181 and an AC bias voltage source 182.

It has been found that when plural prints are produced, the electric charge having the polarity opposite from that of the transfer bias remains on the surface of the dielectric sheet 15A after one image formation, and without removing the electric charge, the transfer operation becomes poorer gradually.

Figure 2:
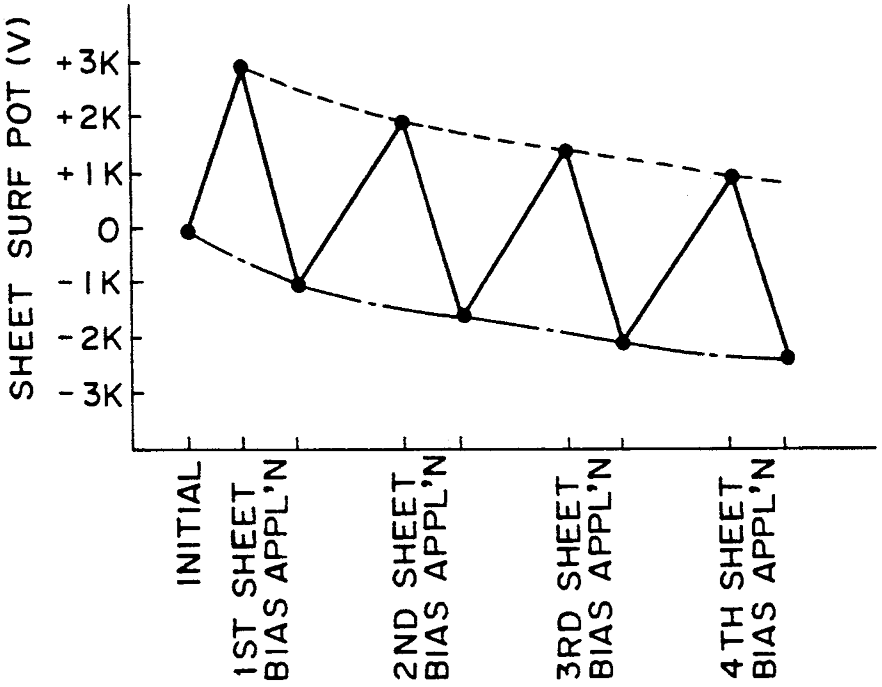
FIGS. 2 and 3 show the surface potential of the transfer drum.

More particularly, when the voltage source 47 applied +3 KV as the transfer bias, the surface potential of the dielectric sheet 15A was +3 KV. After the image transfer, the surface potential of the dielectric sheet 15A was −1 KV when the transfer bias was shut off. When the +3 KV transfer bias was applied again, the surface potential of the dielectric sheet 15A lowered to +2 KV. After the transfer operation, the surface potential of the sheet 15A was −1.5 KV when the transfer bias was shut off. In this manner, the transfer operations were repeated, and the surface potential of the sheet 15A was measured. The results are shown in FIG. 2. In this Figure, the solid line shows the change of the actual surface potential of the sheet 15A. Indicated by the broken line A shows the surface potential of the sheet 15A at the transfer operation. Indicated by the chain line B is the residual charge amount of the sheet 15A.

As will be understood from FIG. 2, the residual electric charge of the negative polarity increases on the sheet 15A with the process of the printing operation. Together with the increase, the surface potential of the sheet 15A at the time of the transfer operation also decreases, with the result of poorer transfer efficiency.

Generally, in order to remove the residual charge on the dielectric sheet 15A, a separate electric discharger is needed. According to this embodiment of the present invention, however, when the transfer material is attracted onto the sheet 15A, the attraction roller 45 is supplied with an oscillating voltage in the form of a DC biased AC voltage, by which the residual electric charge on the sheet 15A can be removed.

Figure 3:
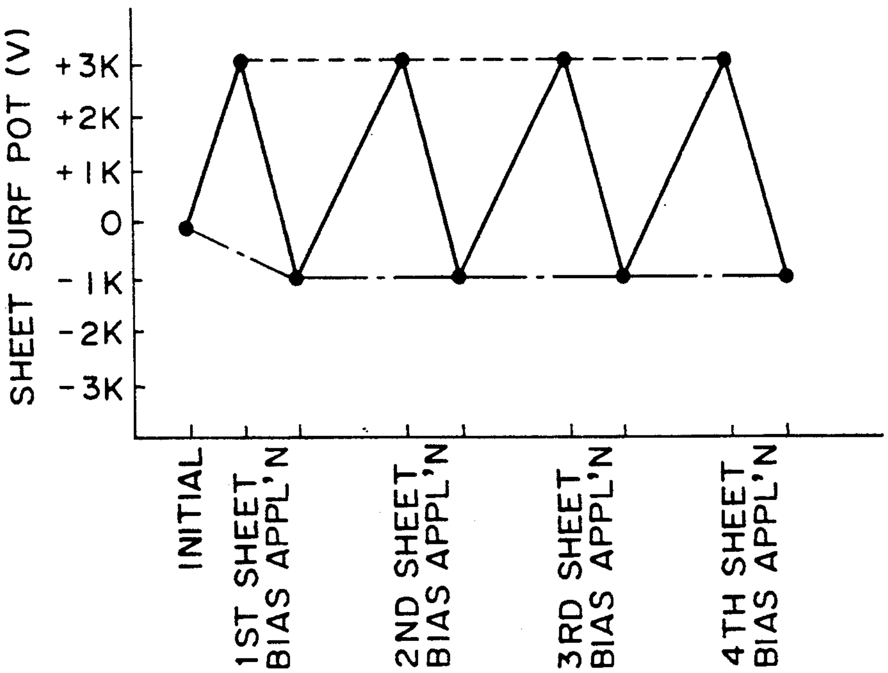

FIG. 3 shows the surface potential change of the dielectric sheet 15A when the attraction roller 45 is supplied with a bias voltage which is provided by superposing a DC bias (+3 KV) supplied from the DC bias voltage source 181 and an AC bias (500 Hz, 2000 Vpp)

supplied from an AC bias voltage source 182. As will be understood from FIG. 3, the residual charge (B in the Figure) on the dielectric sheet 15A does not increase, and the surface potential A during the transfer operation is maintained at +3 KV. This is because the residual charge on the sheet 15A is removed by the rectifying effect of the AC bias in the transfer material attracting action.

The AC bias applied to the attraction roller 45 will be described in further detail. If the frequency is too low, the non-uniform discharging occurs with the result of dark and light stripes on the transferred image in accordance with the no-uniformity. If, on the contrary, it is too high, the charging noise is produced, and the size and the cost of the bias voltage source 128 are increased by the increase of the AC current. Therefore, the frequency is preferably 150 Hz–5 KHz, and further preferably 200 Hz–1 KHz.

As regards the amplitude, if it is smaller than 1000 Vpp, the sheet 15A is not completely discharged electrically, and therefore, the potential during the transfer operation lowered when long term printing continued. The reason is as follows. In this embodiment, the charge starting voltage when only a DC voltage is applied to the attraction roller 45, is approximately 500 V. Therefore, if the amplitude is less than 1000 Vpp, both of the positive and negative electric charges are not moved, and therefore, the rectifying discharging effects by the use of the AC voltage does not sufficiently work. If it is too high, the charging noise increases, and the voltage may exceeds the durable voltage of the sheet 15A with the result of a pin hole or holes in the sheet 15A. Therefore, the peak-to-peak voltage is preferably not less than twice the charge starting voltage, 1500 Vpp–5000 Vpp, further preferably 2000 Vpp–3000 Vpp.

The waveform of the oscillating voltage may be in the form of a DC voltage biased with a sine oscillating wave or rectangular oscillating wave. If an AC voltage having an amplitude not less than 1000 Vpp was applied, the similar advantageous effects were provided. The oscillating voltage may be in the form of a rectangular wave voltage provided by turning on and off a DC voltage. What is required is that the voltage level periodically changes. As described hereinbefore, by applying a vibratory voltage to the attraction roller 45, the electric discharging action is also possible when the transfer material is attracted to the transfer drum 21, and therefore, the necessity for the separate discharging charger i eliminated.

Figure 4:
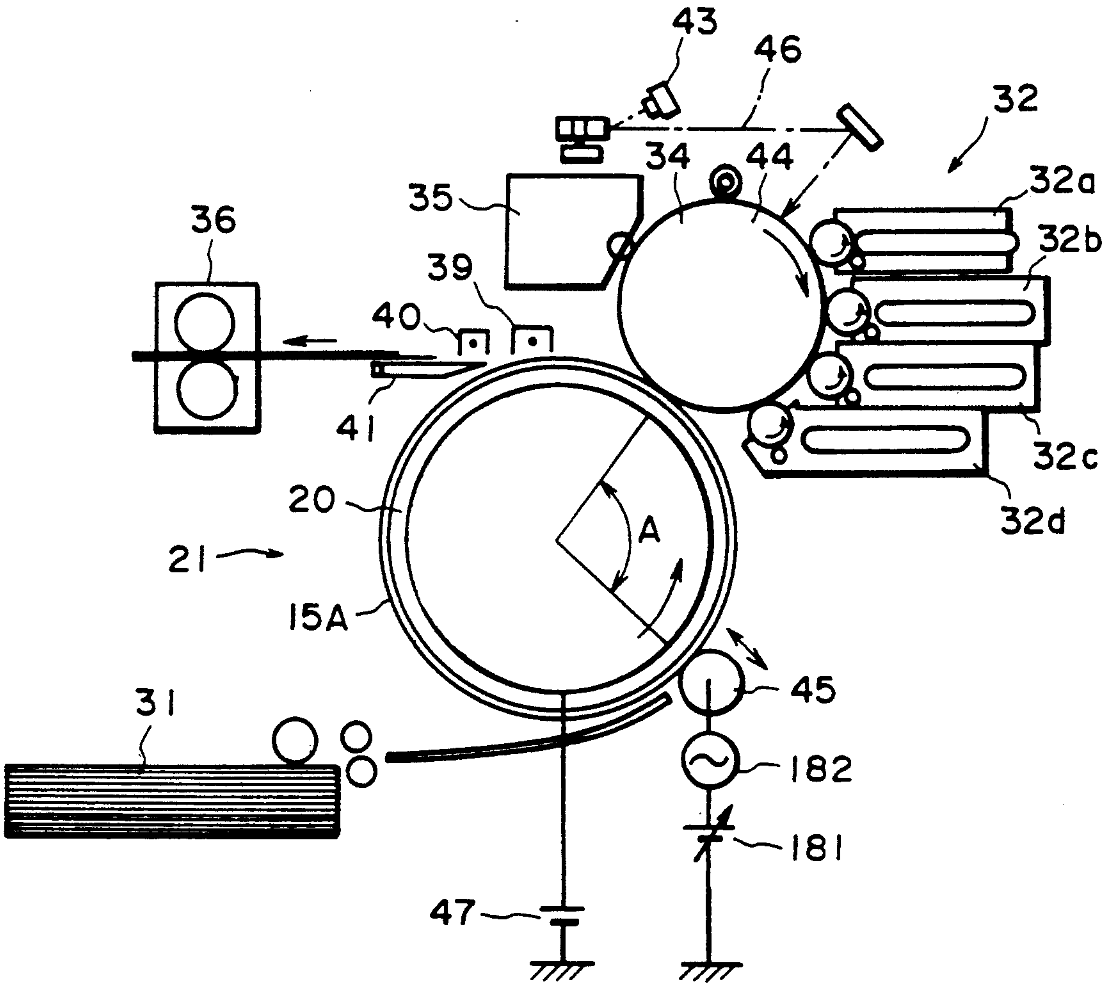
FIG. 4 is a side view of an image forming apparatus according to another embodiment of the present invention.

FIG. 4 shows another embodiment of the present invention in which the recording material carrying means is in the form of a transfer drum 21 as used in the embodiment of FIG. 1. The transfer drum 21 comprises an electrically conductive cylindrical drum 20 and a dielectric flexible sheet 20 thereon. The attraction roller 45 is connected with a DC bias voltage source 181 and an AC bias voltage source 182 an oscillating voltage to the attraction roller 45 for the purpose of producing the alternating electric field. The oscillating voltage is in the form of a DC biased AC. The DC bias voltage source 181 produces a variable voltage. In this embodiment, the necessity for the additional discharging charger is eliminated. The transfer memory and the resultant density non-uniformity can be prevented even if the transfer drum 21 has the structure including the base 20 not having the cut-away portion, and the flexible sheet 15A thereon.

Figure 9:
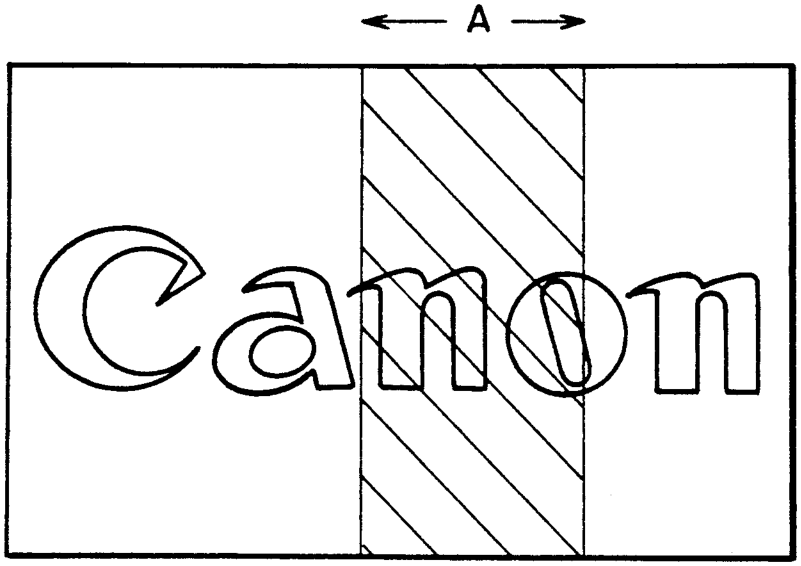
FIG. 9 illustrates reverse-development due to transfer memory on a transfer material.

The description will be made as to the transfer memory. When the transfer material reaches the attraction roller 45, the transfer bias voltage is applied from the voltage source 47. In the region indicated by reference A in FIG. 4, the photosensitive drum 34 and the flexible sheet 15A are directly contacted, that is, not through the transfer material, and therefore, excessive electric charge moves to the photosensitive drum 34. The excessive electric charge on the photosensitive drum 34 is partly removed by the primary charger 44, but partly remains. Particularly when the reverse-development is used in which the polarity of the primary charger 44 is opposite from that of the charge of the transfer bias, the region corresponding to the region A is developed and appears on the developed image, as shown in FIG. 9, with the result of remarkable deterioration of the image quality. In order to prevent this, it is considered that the transfer bias is applied when the transfer material reaches the transfer position. However, if this is done, the following image density occurs.

Figure 5:
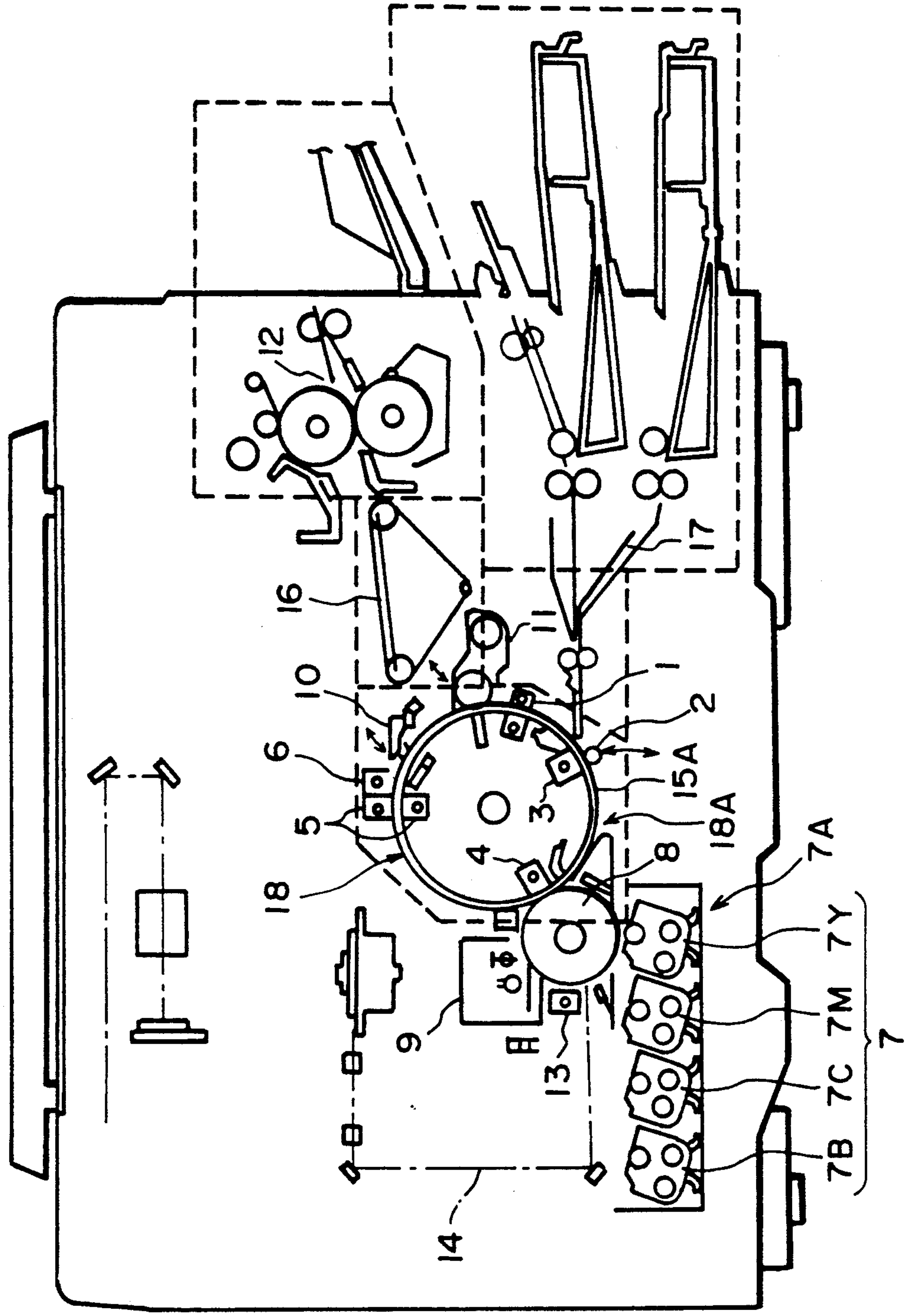
FIG. 5 is a sectional view of a conventional image forming apparatus.
Figure 10:
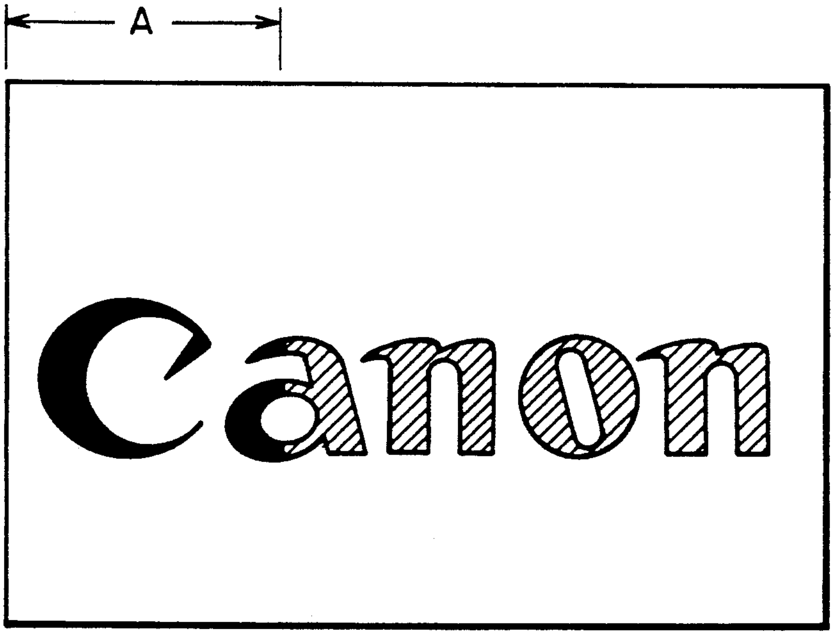
FIG. 10 illustrates non-uniformity of the image density resulting from difference in the transfer efficiency on the transfer material.

Since the transfer bias operation starts during the attracting operation, the potential difference between the attraction roller 45 and the sheet 15A is different between the region A and the other region, and therefore, the electric current flowing from the attraction roller 45 to the transfer material is different with the result of different surface potential during the transfer operation. As shown in FIG. 10, the density non-uniformity occurs on the transfer material due to the transfer efficiency difference, and therefore, the image quality is also deteriorated. The problems of the transfer memory and the density non-uniformity are arisen by the uniform application of the transfer bias voltage to the entire surface of the sheet 15A. In the case of the transfer drum 18 shown in FIG. 5, for example, being used, the voltages can be independently determined upon attracting operation (by the charger 3) and upon transfer operation (by charger 4), and therefore, the problems do not arise.

According to this embodiment, the various DC bias source 181 is used for the attraction roller 45, so that the output of the DC bias voltage source 181 is changed depending on whether the leading edge of the transfer material is between the attraction roller 15 and the transfer region (A in the Figure) and when the leading edge thereof reaches the transfer region. By doing so, the above described problems can be avoided.

Figure 11:
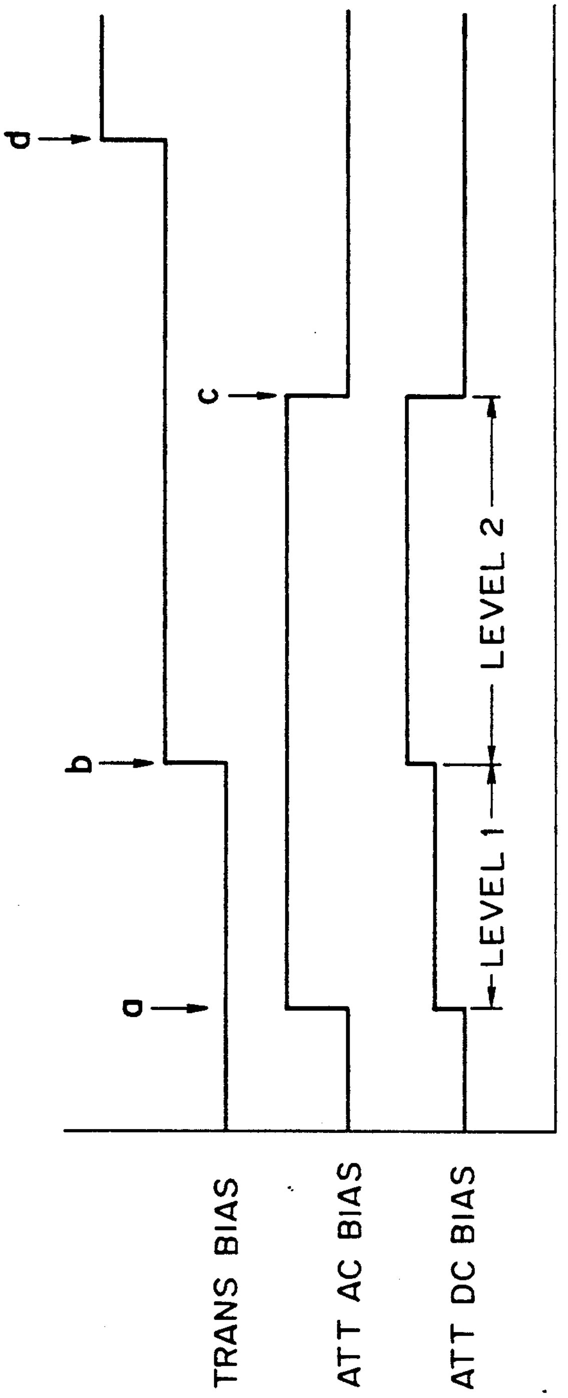
FIG. 11 shows sequential applications of the transfer bias, AC attraction bias and DC attraction bias.

FIG. 11 shows the sequential applications of the transfer bias voltage 47 the attraction DC bias voltage 181 and the attraction AC bias voltage 182.

The transfer material is fed out. When the leading edge thereof reaches the transfer roller 45 (a in the Figure), the attraction AC bias 181 is rendered on. At this time, the transfer bias 47 is kept off. Therefore, the transfer memory is not produced. At this time, the attraction DC bias 181 is at level 1 (ON). With this state, the transfer bias 47 is off, and is therefore, electrically grounded, so that the attraction DC bias voltage 181 may be at the ground level.

In order to increase the electrostatic attraction force of the transfer material, the potential difference may be provided. At this time, the electric current from the attraction roller 45 to the transfer material is codirectional with the electric current from the transfer drum 34 to the transfer material during the transfer action, since otherwise the electric charge supplied to the transfer material during the attraction is removed during the transfer operation with the result of lowering the attraction force.

As regards the potential of level 1, the attraction force for the transfer material increases with increase of the potential difference between the attraction roller 45 and the sheet 15A. However, the transfer bias has to be increased correspondingly, with the result of bulky transfer bias voltage source 47. In addition, the current leakage may be produced between the transfer drum 21 and elements therearound. Therefore, when the transfer bias is of positive polarity, −500−−2000 V is preferable.

When the leading edge of the transfer material reaches the transfer region (B in FIG. 11), the transfer bias is rendered on. At this time, the transfer material is present between the transfer drum 21 and the photosensitive drum 34 in the transfer position, and therefore, no excessive electric charge flows from the transfer drum 21 to the photosensitive drum 34, and therefore, no transfer memory is produced. The preferable value of the transfer bias depends on the thickness of the sheet 15A, the dielectric constant thereof and the electric resistance thereof or the like. Generally, however, when the attraction DC bias voltage is at the ground level, it is preferably +1000 V−+2000 V, and when the attraction DC bias voltage is −500−−2000 V, it is preferably +5000 V−+4000 V.

The attraction AC bias continues to be on, and the attraction DC bias is switched from level 1 to level 2 the level 2 is so selected that the potential difference between the transfer bias and the attraction DC bias in the level 1 state (a in FIG. 11) is maintained. That is, if the transfer bias voltage is 0 V, and the DC bias voltage is −1000 V, in the state a in FIG. 11, the potential difference is 0-(−1000)=1000 V; and in the state b in FIG. 11, if the transfer bias is +2000 V, the attraction DC bias voltage is selected to be +1000 V, by which the potential difference is maintained at 2000-1000 =1000 V, so that the above desired condition is provided.

As described hereinbefore, the potential difference between the drum base 20 of the transfer drum 21 and the attraction roller 45 is maintained constant, and therefore, the rate of the electric current flowing from the attraction roller 45 to the transfer material is constant, and therefore, the density non-uniformity described in conjunction with FIG. 10 does not result.

When the leading edge of the transfer material reaches again to the attraction roller 45, the attraction roller 45 is separated from the transfer roller 21, and both of the attraction AC bias and the DC bias are rendered off. When the leading edge thereof reaches the transfer region (d in FIG. 11), the transfer bias is switched to the level matching the second color transfer. As for the transfer bias for the second color, it compensates for the reduction of the surface potential of the transfer material during the first color transfer operation, more particularly, it may be a sum of the first color transfer bias voltage level +200−1000 V, approximately. The transfer operation is effected for three and subsequent colors, and the color image is produced.

As described in the foregoing, by switching the DC bias applied to the attraction roller, the transfer memory and the density non-uniformity can be prevented.

Figure 12:
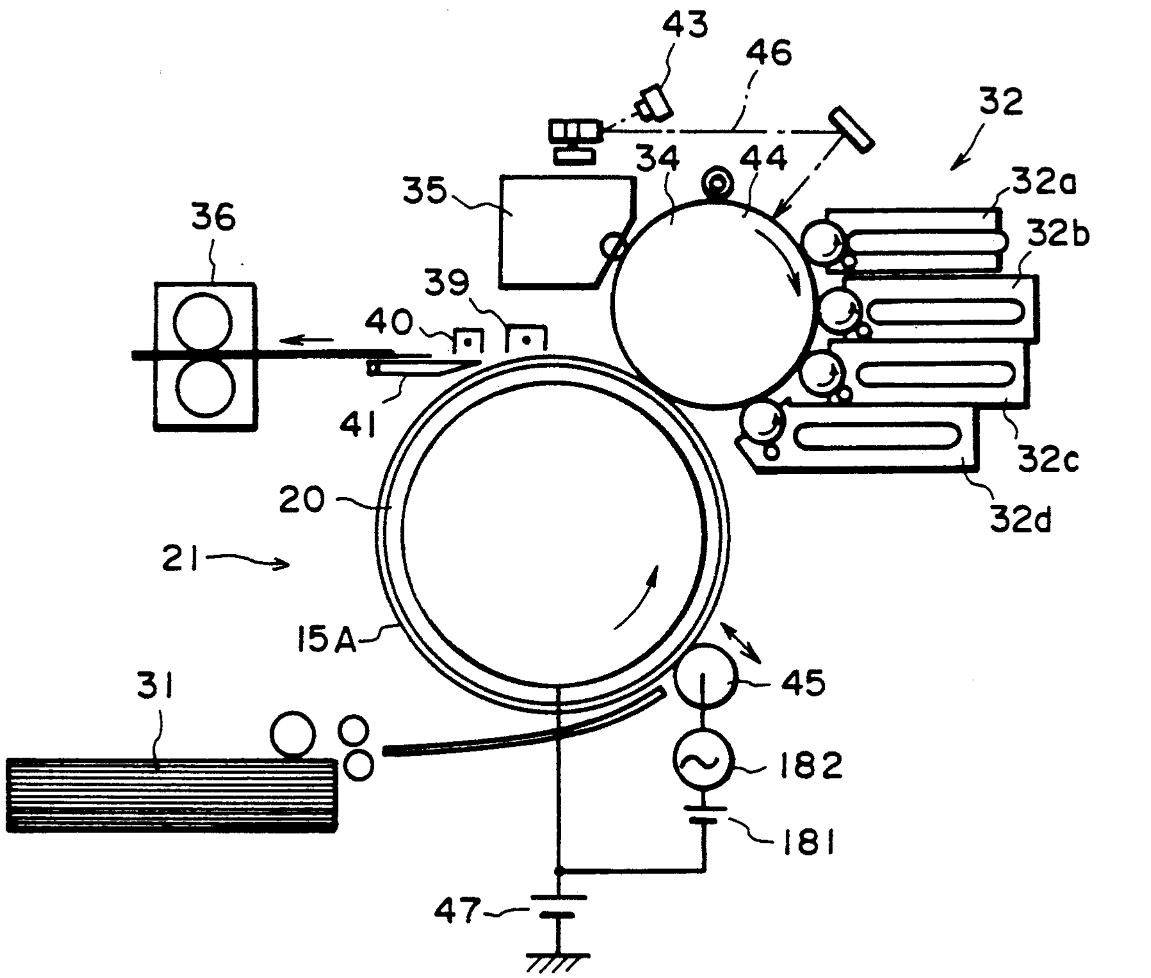
FIG. 12 is a sectional view of an image forming apparatus according to a further embodiment of the present invention.

FIG. 12 shows a further embodiment of the present invention. In the previous embodiment, the attraction roller 45 is supplied with an oscillating voltage in the form of a DC biased AC voltage, and the DC bias voltage component is changed to prevent the occurrence of the transfer memory and the non-uniformity of the image density. In this embodiment, the transfer memory and the non-uniformity of the image density can be prevented without changing the DC bias voltage.

In FIG. 12, the same reference numerals as in the previous embodiment are assigned to the element having the corresponding structure and functions, and the detailed description thereof are omitted for simplicity. In this embodiment, the attraction bias is in the form of a DC biased AC voltage, and the output thereof is produced and applied with the reference potential which is the output of the transfer bias voltage source 47. Therefore, however the output of the transfer bias voltage source 47 changes, the potential difference between the base member 20 of the transfer drum 21 and the attraction roller 45 is determined on the basis of the outputs of the attraction bias voltage sources 181 and 182, and therefore, the image non-uniformity is not produced even if the output of the DC bias voltage source 181 is not changed.

Figure 13:
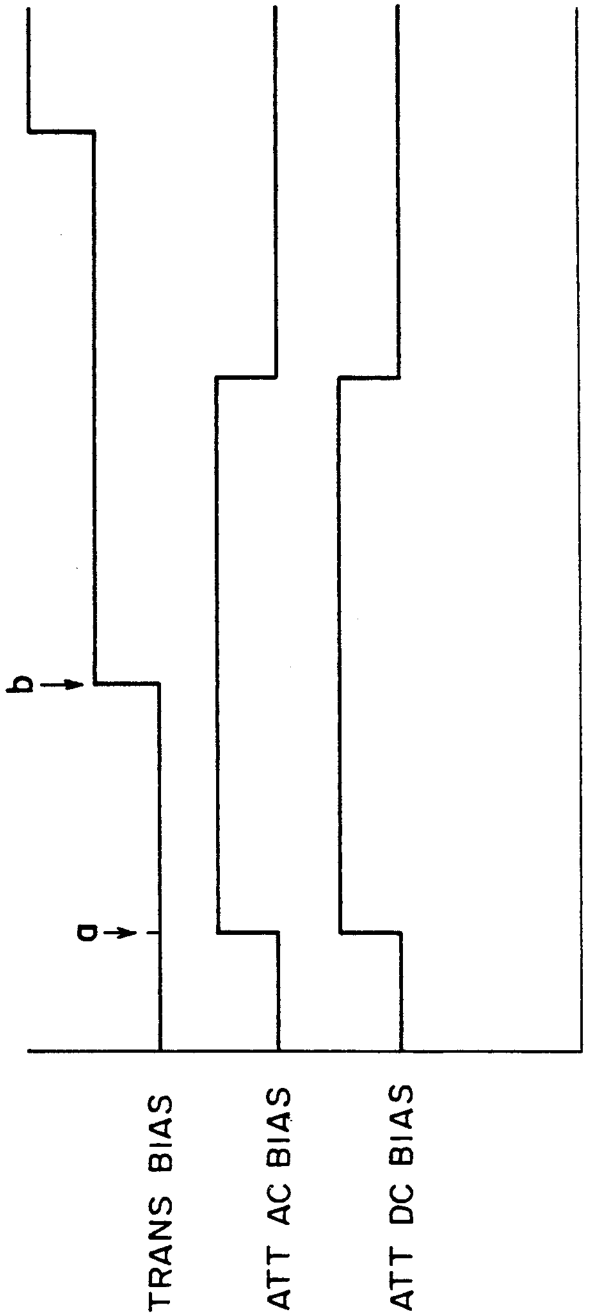
FIG. 13 illustrates sequential applications of an image transfer bias, an AC attraction bias and a DC attraction bias.

FIG. 13 shows the sequential application of the transfer bias, attraction AC bias and attraction DC bias. In FIG. 13, when the leading edge of the transfer material 31 reaches the attraction roller 45 (a in FIG. 13), the AC attraction bias voltage and the DC attraction bias voltage are rendered on. At this time, in order to prevent the transfer memory, the transfer bias is maintained off. When the leading edge of the transfer material 31 reaches the transfer region (b in this Figure), the transfer bias is rendered on, and the attraction AC bias voltage and the attraction DC bias voltage are continued to be on with the same output levels. In this case, as described hereinbefore, the potential difference is maintained constant between the attraction roller 45 and the base member 20 of the transfer drum 21, and therefore, the electric current flowing from the attraction roller 45 to the transfer material 31 is constant, and therefore, the non-uniformity of the image density as shown in FIG. 10 is not produced.

As described hereinbefore, according to this embodiment, the attraction bias is in the form of a DC biased AC voltage, and therefore, the necessity for the discharging charger is eliminated. In addition, by producing an output of an attraction bias with the difference potential of the output of the transfer bias voltage source 47, the transfer memory, the density non-uniformity can be prevented without changing the DC component of the attraction bias, and therefore, the necessity for the means for changing the DC bias voltage is eliminated, and therefore, the cost can be reduced.

The detailed description will be made as to the operational timing of the attraction bias or the discharging bias applied to the attraction roller 45 and the timing of the engagement between the attraction roller 45 and the transfer drum 21.

Figure 14:
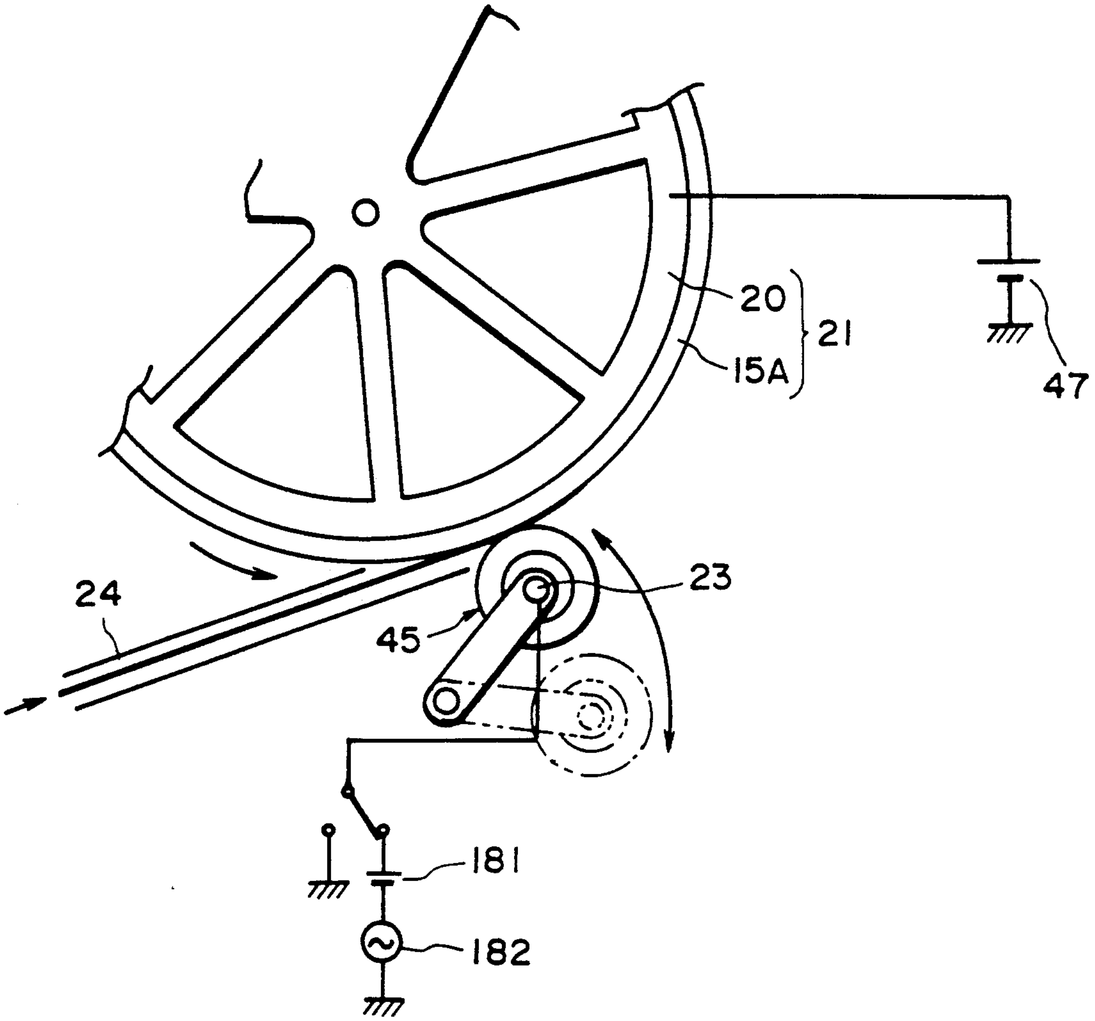
FIGS. 14 and 16 are enlarged sectional views of the structure around the transfer material carrying means of an image transfer device used in a color image forming apparatus according to a further embodiment of the present invention.

Referring to FIG. 14, the transfer drum 21 is in the form of a solid drum 21 comprising a conductive drum 20 and the dielectric sheet 15A thereon. To the bottom of the transfer drum 21, there is an attraction roller 45 adjacent thereto, as in the case of the color image forming apparatus of FIG. 1. The attraction roller 45 is effective to attract the transfer material on the dielectric sheet 15A by the bias voltage applied to the drum base 20 behind the dielectric sheet 15A from the attraction voltage sources 181 and 182 connected to the conductive drum base 20. At this time, by the bias sources 181 and 182 connected to the roller core metal 23, the electric charge corresponding to the bias is injected into the transfer material 31, by which the transfer material 31 is closely contacted to the dielectric sheet 15A.

In this embodiment, the transfer material 31 having the superposed transferred image is separated from the dielectric sheet 15A of the transfer drum 21. Thereafter, the discharging means electrically discharges the dielectric sheet 15A. The attraction roller 45 also functions as such a discharging means. In the following image formation process, the reference will be made to the color image forming apparatus of FIG. 1.

The transfer material 31 conveyed to the transfer drum 21 is pushed to the dielectric sheet 15A by the attraction roller 45 on the dielectric sheet 15A at the surface of the transfer drum 21, the attraction roller 45 being movable toward and away from the dielectric sheet 15A. Simultaneously, it is attracted on the dielectric sheet 15A by the electrostatic attraction force provided by the bias voltage applied to the drum base 20 made of metal such as aluminum or the like. The transfer material 31 is wrapped around the transfer drum 21 from the leading edge thereof, and is conveyed by the rotation of the transfer drum 21 to the image transfer position where the image bearing member 34 and the transfer drum 21 are contacted. At this time, the attraction roller 45 is maintained at the ground level or at a potential of a polarity opposite from that of the bias applied to the drum base 20 from the voltage sources 181 and 182, until the trailing edge of the transfer material 31 passes through the attraction point where the attraction roller 45 is contacted to the dielectric sheet 15A. After the trailing edge of the transfer material 31 passes through the attraction point, the attraction roller 45 is separated from the dielectric sheet 15A.

In parallel with the attraction process, at the image transfer position, the first color image on the image bearing member 34 is electrostatically transferred onto the coming transfer material 31 by the power supply from the transfer voltage source 47. Subsequently, the transfer material 31 receives the second color, the third color and the fourth color images, in the similar manner. Thereafter, it is separated from the transfer drum 21 by the separating charger 39 and the separation pawls 41, and is conveyed to the image fixing device 36. In this embodiment, when the transfer material 31 is separated from the transfer drum 21, the attraction roller 45 which has been moved away during the image transfer action is again contacted to the transfer drum 21 at the time when the trailing edge of the transfer material 31 passes through the attraction point, so that the dielectric sheet 15A at the surface of the transfer drum 21 is electrically discharged. The dielectric sheet 15A is electrically discharged if the attraction roller 45 is grounded so as to escape the electric charge. However, in order to efficiently discharge the dielectric sheet 15A after the transfer material 31 is separated after the image forming process, it is effective to apply such a bias voltage that the attraction roller 45 neutralize the surface potential on the dielectric sheet 15A.

In the case of the solid type transfer drum 21 comprising the conductive drum base 20 and a dielectric sheet 15A thereon, when the final color transfer bias is applied to the transfer drum 21, such a DC bias as is equivalent to the transfer bias voltage of the same polarity is applied so as to converge to the applied transfer bias voltage, by which the residual charge on the dielectric sheet 15A is removed. When the transfer bias is not applied and grounded, the residual charge on the dielectric sheet 15A is removed by the grounded attraction roller 45. At this time, the discharging effect is increased by adding an AC bias component to the DC bias component of the discharging bias for the dielectric sheet 15A. In order to discharge the sheet more effectively, the discharging operation of the attraction roller 45 is carried out while an AC bias voltage is being applied to the conductive drum base, after the transfer material 31 is completely separated from the transfer drum 21. In addition, the discharging effect is further enhanced by deviating the AC bias periods from each other.

Figure 15:
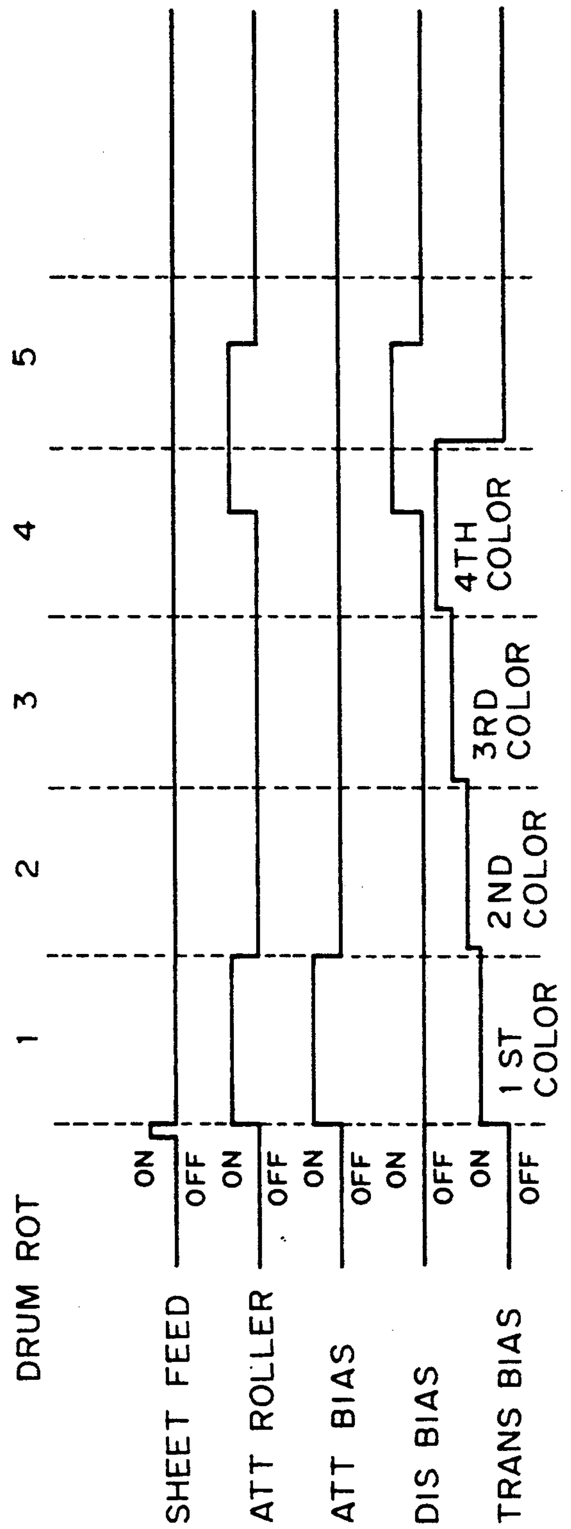
FIG. 15 shows sequential operation of the image formation process carried out by the color image forming apparatus of FIG. 14.

The surface potential of the dielectric sheet 15A after the separation of the transfer material 31 changes significantly due to the variation in the ambient conditions such as humidity, and in addition it is dependent on the material constituting the dielectric sheet 15A. In view of them, it is preferable to change the sheet discharging bias level in accordance with the ambient conditions and the natures of the dielectric sheet 15A. The sequential applications of the sheet discharging bias and the timing of contacting the attraction roller 45 in the image forming operation, are shown in FIG. 15. The timing and the sequential applications of this Figure are for the case in which the entire image forming process is completed by 5 rotations of the transfer drum 21 with the start point being the attraction point. Therefore, the sheet has been discharged already at the transfer bias voltage application. However, in the case where the image forming process is not so tight with respect to time, the discharging action may be carried out after the completion of the final color image transfer or after the transfer material 31 is completely separated.

As described in the foregoing, according to this embodiment, after the transfer material 31 having the superposed images is separated from the dielectric sheet 15A of the transfer drum 21, the attraction roller 45 electrically discharges the dielectric sheet 15A, by which the attraction roller 45 functions also as the sheet discharging means without the necessity for the additional corona discharger for the sheet discharging purpose. Therefore, the number of corona chargers around the transfer drum 21 can be reduced, and therefore, the size and the cost of the image forming apparatus can be reduced. In addition, the production of the ozone due to the corona discharge can be reduced corresponding to the elimination of the sheet discharging discharger.

The image forming process has been described with the transfer device of a solid drum (21) type. However, this embodiment is applicable to the transfer drum having the cut-away portion as shown in FIG. 6. In this case, the attraction roller 45 is grounded, or such a bias voltage as to neutralize the potential on the dielectric sheet 15A surface is applied to the attraction roller 45 by the voltage sources 181 and 182, and the attraction roller 45 is contacted to the dielectric sheet 15A. However, the sheet discharging at this time, unlike the case of the solid type transfer drum 21, the backside of the dielectric sheet 15A is electrically insulated, and therefore, the discharging is possible only with the AC component. The AC component may be biased with the DC component.

As described hereinbefore, the bias conditions are dependent significantly on the nature of the dielectric sheet 15A, the ambient conditions and the discharging time. The experiments showed that the sufficient discharging is possible only with the AC component when PET (polyethylene terephthalate) is used, whereas when PVdF (polyvinylidene fluoride) with the stronger internal polarization, the effective discharging effect was provided when the DC component of several hundred and several KV of the polarity opposite from that of the surface potential was applied. When the bias voltage is applied, the shield of the attraction charger 3 (FIG. 5) functioning as the opposite electrode of the attraction roller 45 may be grounded, but it may be maintained at a potential of the polarity opposite from the bias voltage applied to the attraction roller 45. When the AC voltage is applied to the attraction roller 45, it is effective to apply an AC voltage having a period different from that of the AC voltage.

In the foregoing, the ozone production during the discharging step is minimized. However, when the image formation process speed is high, and the sufficient discharging period is not given, the application of corona discharging of the polarity opposite from that in the attraction operation is applied by the attraction charger 3. In this case, AC biased DC is preferable to the DC component only. It is further preferable that the period is made different from the period of the AC component applied to the attraction roller 45.

Figure 16:
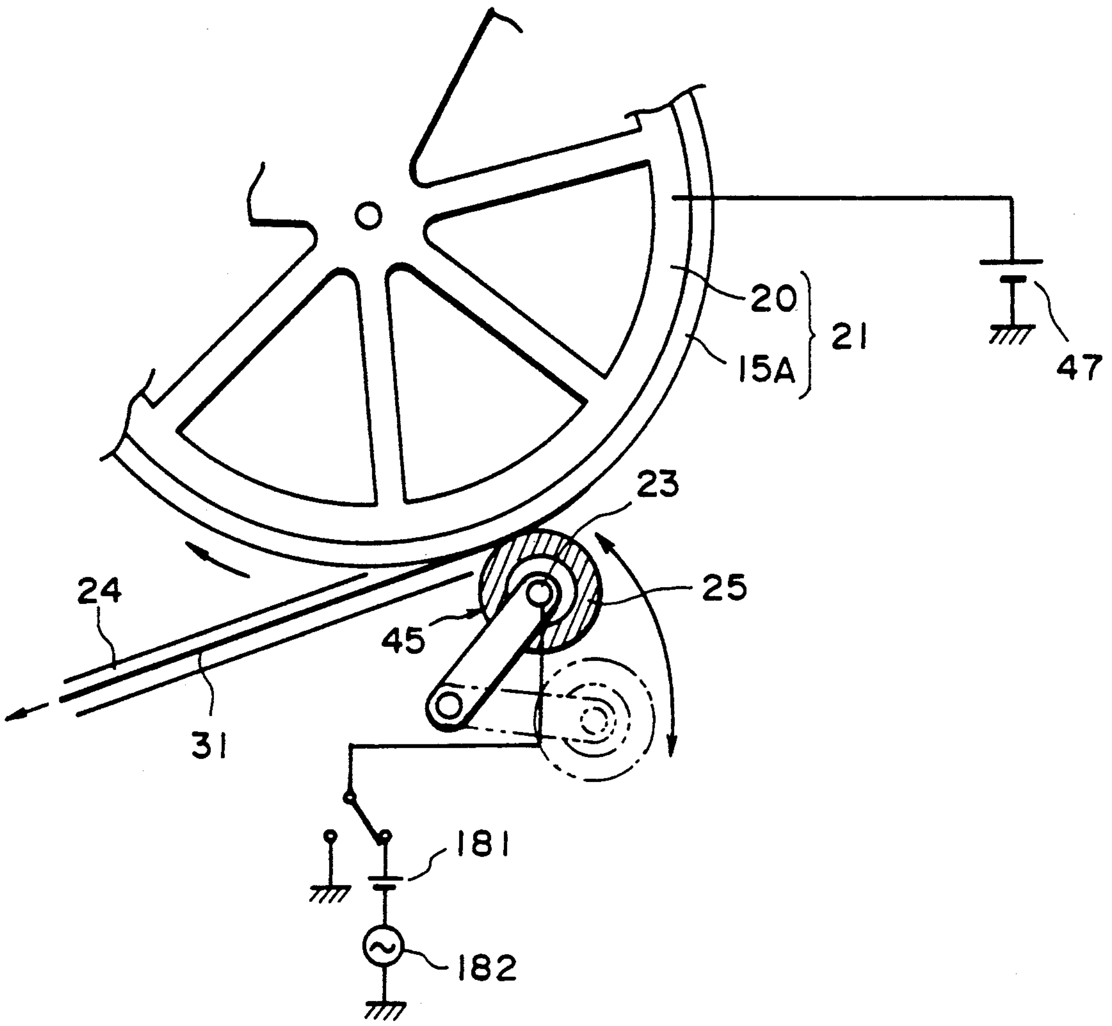

FIG. 16 is an enlarged sectional view around the transfer material supporting portion in the transfer device of an image forming apparatus according to a further embodiment of the present invention. In this embodiment, the surface layer of the attraction roller 45 is made of elastic member 25 having a low or intermediate resistance. The apparatus of this embodiment is essentially the same as those in FIGS. 14 and 15 embodiment.

Because the surface layer of the attraction roller 45 is made of elastic material 19 having the low or intermediate resistance, formation of pin holes in the dielectric sheet 15A due to the abnormal electric current produced by bias voltage application for the dielectric sheet 15A discharging. In addition the close contact to the dielectric sheet 15A is better than in the case of the formation of the entirety of the attraction roller 45 by rigid material. Therefore, the presence of the air layer between the dielectric sheet 15A and the transfer material 31 when the transfer material 31 is retained on the dielectric sheet 15A, can be minimized. In addition, dielectric loss of the transfer material 31 to the dielectric sheet 15A can be reduced, and therefore, the electrostatic attracting operation is stabilized.

As for the elastic material 25 of the surface layer of the attraction roller 45, it preferably has the volume resistivity of not more than approximately $10^9$ ohm.cm. The hardness of the elastic material 25 is preferably 5–8 degrees (JIS A) in view of the friction with the dielectric sheet 15A, and the hardness matches the hardness of the dielectric sheet 15A. For example, when the dielectric sheet 15A has a thickness of 150 microns and is made of PVdF sheet, the experiments showed good results if the elastic material 25 is made of silicone rubber, CR rubber, urethane rubber or the like having the hardness of 30–50 degrees. The good results include the attraction of the transfer material 31 on the dielectric sheet 15A by the attraction roller 45 and the electric discharge of the dielectric sheet 15A.

Figure 17:
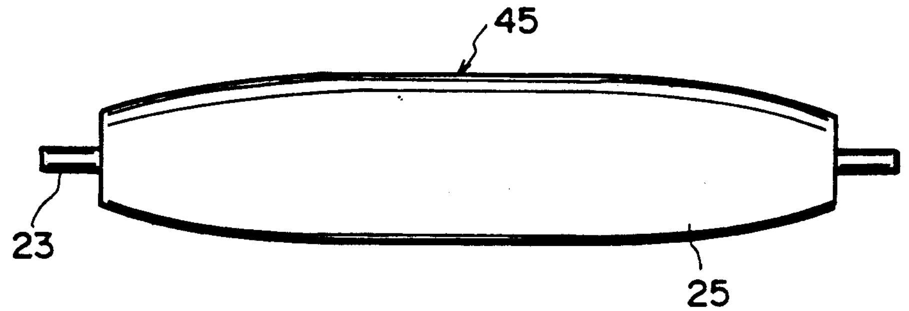
FIG. 17 is a side view of an attraction roller.

In the foregoing embodiments, the configuration of the attraction roller 45 has been normal cylindrical configuration. However, the attraction roller 45 is crowned as shown in FIG. 17 (further embodiment of the color image forming apparatus according to the present invention), more particularly, the diameter of the attraction roller 45 is made larger at the central portion than the end portions. By doing so, the air layer between the transfer material 31 and the dielectric sheet 15A when the transfer material 31 is attracted onto the dielectric sheet 15A, can be pushed out to the opposite end portions of the transfer material 31, and therefore, the crowned attraction roller 45 is preferable.

While the invention has been described with reference to the structures disclosed herein, it is not confined to the details set forth and this application is intended to cover such modifications or changes as may come within the purposes of the improvements or the scope of the following claims.

What is claimed is:

1. An image forming apparatus, comprising:

recording material carrying means for carrying a recording material;

image forming means for forming an image on a recording material carried on said recording material carrying means;

an attraction member for electrostatically attracting the recording material on said recording material carrying means, said attraction member being contactable to said recording material carrying means and said attraction member and said recording material carrying means forming a nip therebetween; and voltage applying means for applying an oscillating voltage to said attraction member during a period in which the recording material passes through the nip formed between said attraction member and said recording material carrying means.

2. An apparatus according to claim 1, wherein said oscillating voltage is in the form of an AC biased voltage.

3. An apparatus according to claim 1 or 2, wherein said oscillating voltage has a peak-to-peak voltage which is not less than twice a charge starting voltage of said recording material carrying means.

4. An apparatus according to claim 1, wherein said recording material carrying means comprises a surface dielectric layer and a conductive layer behind it.

5. An apparatus according to claim 4, further comprising potential applying means for selectively applying to said attraction member a first potential and a second potential which is different from the first potential, wherein said potential applying means switches from the first potential to the second potential during an operation of said attraction member.

6. An apparatus according to claim 5, wherein said image forming means includes an image bearing member on which the image is formed, and the image is transferred onto the recording material carried on said recording material carrying means.

7. An apparatus according to claim 6, further comprising a second voltage applying means for applying a transfer voltage to the conductive layer for image transfer.

8. An apparatus according to claim 7, wherein a potential applied by said potential applying means is switched from the first potential to the second potential in synchronism with start of a voltage application of said second voltage applying means.

9. An apparatus according to claim 4, wherein said image forming means includes an image bearing member on which the image is formed, and the image is transferred onto the recording material carried on said recording material carrying means.

10. An, apparatus according to claim 9, wherein said oscillating comprises a DC voltage which is applied to the conductive layer for image transfer.

11. An apparatus according to claim 8, wherein said potential applying means switches from the first potential to the second potential when a leading edge of the recording material carried on said carrying means passes through a transfer position where the image is transferred from the image bearing member onto the recording material.

12. An apparatus according to claim 6 or 9, wherein said attraction member is disposed across the dielectric layer from the conductive layer, wherein a polarity of the current flowing from said attraction member to the recording material during attracting operation is the same as the polarity of the current flowing from the image bearing member to the recording material during the transfer operation.

13. An apparatus according to claim 7 or 8, wherein said second voltage applying means applies the transfer voltage to the conductive layer only during the image transfer operation.

14. An apparatus according to claim 10 or 11, wherein the DC voltage is applied to the conductive layer only during the transfer operation.

15. An apparatus according to claim 13, further comprising charging means for charging the image bearing member for formation of the image on the image bearing member, and a charging polarity of the charging means is opposite from that of the transfer voltage.

16. An apparatus according to claim 14, further comprising charging means for charging the image bearing member for formation of the image on the image bearing member, and a charging polarity of the charging means is opposite from that of the DC voltage.

17. An apparatus according to claim 11, wherein said attraction member is capable of electrically discharging said recording material carrying means.

18. An apparatus according to claim 17, wherein said attraction member electrically discharges said recording material carrying means after the recording material is separated from said recording material carrying means.

19. An apparatus according to claim 4, wherein said attraction member is disposed across the dielectric layer from the conductive layer.

20. An apparatus according to claim 4, wherein the dielectric layer is in the form of a sheet.

21. An apparatus according to claim 1, wherein said image forming means includes an image bearing member on which the image is formed, and the image is transferred onto the transfer material carried on said recording material carrying means.

22. An apparatus according to claim 21, wherein a plurality of the images are formed on the image bearing member, and the images are transferred onto the recording material one by one.

23. An apparatus according to claim 22, wherein said apparatus is capable of forming a full-color image on the recording material.

24. An image forming apparatus comprising:

recording material carrying means for carrying a recording material;

image forming means for forming an image on the recording material carried on said carrying means;

an attraction member for electrostatically attracting the recording material onto said carrying means, wherein said attracting member is capable of electrically discharging said recording material carrying means after a trailing edge of the recording material passes said attraction member.

25. An apparatus according to claim 24, wherein said recording material carrying means includes a surface dielectric layer and a conductive layer behind it.

26. An apparatus according to claim 25, wherein said attraction member is disposed across the dielectric layer from the conductive layer.

27. An apparatus according to claim 26, wherein a polarity of a current flowing from said attraction member to the recording material during attraction operation is the same as a polarity of a current flowing from said image bearing member to the 28. An apparatus according to claim 24 wherein said image forming means includes an image bearing member on which the image is formed, and the image is transferred from the image bearing member onto the recording material carried on said carrying means. recording material during image transfer operation.

29. An apparatus according to claim 28, wherein a plurality of the images are formed on the image bearing member, and the images are transferred superposedly on the recording material one by one.

30. An apparatus according to claim 24, wherein said attraction member electrically discharges said carrying means after the recording material is separated from said recording material carrying means.

31. An apparatus according to claim 29, wherein said apparatus is capable of forming a full-color image on the recording material.

32. An apparatus according to claim 29, wherein said dielectric layer is in the form of a sheet.

33. An apparatus according to claim 24 or 29, wherein said attraction member is movable between a position contacting said recording material carrying means and a non-contacting position, wherein said attraction member effects its attracting and discharging operations when said attraction member is in the contacting position.

* * * * *

UNITED STATES PATENT AND TRADEMARK OFFICE
CERTIFICATE OF CORRECTION

PATENT NO. : 5,249,023

DATED : September 28, 1993

INVENTOR(S) : Toshiaki Miyashiro, et al.

It is certified that error appears in the above-identified patent and that said Letters Patent is hereby corrected as shown below:

COLUMN 1
Line 46, "poly" should read --poly- --;
Line 53, "t" should read --the--;
Line 54, "he" should be deleted.

COLUMN 3
Line 35, "i" should read --is--;
Line 57, "i" should read --is--.

COLUMN 7
Line 13, "no-uniformity." should read --non-uniformity.--;
Line 31, "exceeds" should read --exceed--;
Line 50, "i" should read --is--.

COLUMN 10
Line 8, "are" should read --is--.

COLUMN 15
Line 2, "oscillating" should read --oscillating voltage--.

UNITED STATES PATENT AND TRADEMARK OFFICE
CERTIFICATE OF CORRECTION

PATENT NO. : 5,249,023 Page 2 of 2

DATED : September 28, 1993

INVENTOR(S) : Toshiaki Miyashiro, et al.

It is certified that error appears in the above-identified patent and that said Letters Patent is hereby corrected as shown below:

COLUMN 16

Line 32, "re-" should be deleted;
Line 33, line 33 should be deleted;
Line 46, "Claim 29" should read --Claim 25,--.

Signed and Sealed this

Seventeenth Day of May, 1994

Attest:

BRUCE LEHMAN

*Attesting Officer* *Commissioner of Patents and Trademarks*

UNITED STATES PATENT AND TRADEMARK OFFICE

CERTIFICATE OF CORRECTION

PATENT NO. : 5,249,023

DATED : September 28, 1993

INVENTOR(S) : TOSHIAKI MIYASHIRO, ET AL.

It is certified that error appears in the above-indentified patent and that said Letters Patent is hereby corrected as shown below:

Column 16,

Line 27, "to the" should read --to the recording material during image transfer operation.--

Signed and Sealed this

Fourteenth Day of June, 1994

Attest:

BRUCE LEHMAN

*Attesting Officer*

*Commissioner of Patents and Trademarks*